United States Patent [19]

Ganter

[11] Patent Number: 4,479,816

[45] Date of Patent: Oct. 30, 1984

[54] APPARATUS FOR SCRUBBING GASES

[75] Inventor: Walter Ganter, Pullach, Fed. Rep. of Germany

[73] Assignee: Theisen GmbH, Munich, Fed. Rep. of Germany

[21] Appl. No.: 427,563

[22] Filed: Sep. 29, 1982

[30] Foreign Application Priority Data

May 28, 1982 [DE] Fed. Rep. of Germany ....... 3220328

[51] Int. Cl.$^3$ ............................................. B01D 47/00
[52] U.S. Cl. ...................................... 55/230; 55/406; 261/90
[58] Field of Search ................. 55/230, 400, 401, 402, 55/403, 406, 407; 261/89, 90

[56] References Cited

U.S. PATENT DOCUMENTS 2,338,373  1/1944  Aurig .................................... 261/90

Primary Examiner—Bernard Nozick
Attorney, Agent, or Firm—Kenyon & Kenyon

[57] ABSTRACT

In a disintegrator gas scrubber having a flat fan casing in which a stator bar cage is provided which consists of a plurality of concentric rings of bars extending parallel to the axis, and in which a rotor bar cage rotates which engages in the stator bar cage and likewise consists of a plurality of concentric rings of bars extending parallel to the axis, a cleansing liquid is injected by means of a cleansing liquid distributor means disposed on the rotor shaft of the rotor bar cage into the centrally aspired gas which is conveyed by the bars, the liquid being finely divided by those bars. A novel geometry and design of the stator bar cage and of the rotor bar cage are indicated to enlarge the purifying effect so as to embrace also the finest dusts of a particle size of less than 1 μm and to permit separation of the same at optimum effectiveness without impairing the fan efficiency.

1 Claim, 4 Drawing Figures

U.S. Patent  Oct. 30, 1984  4,479,816
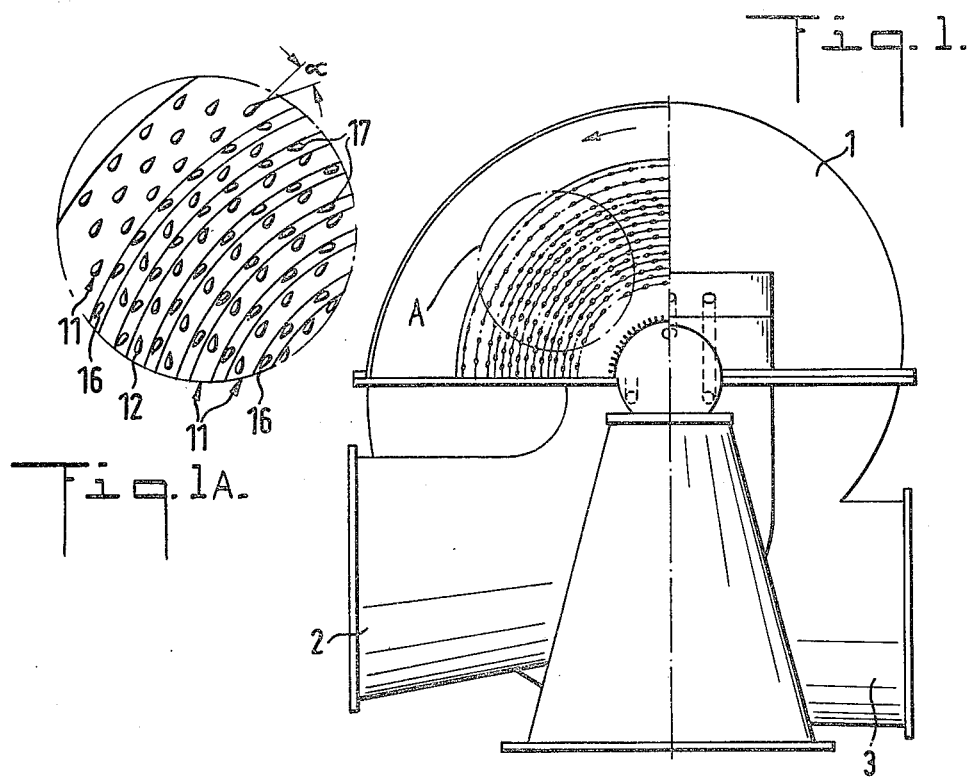
Fig. 1.
Fig. 1A.
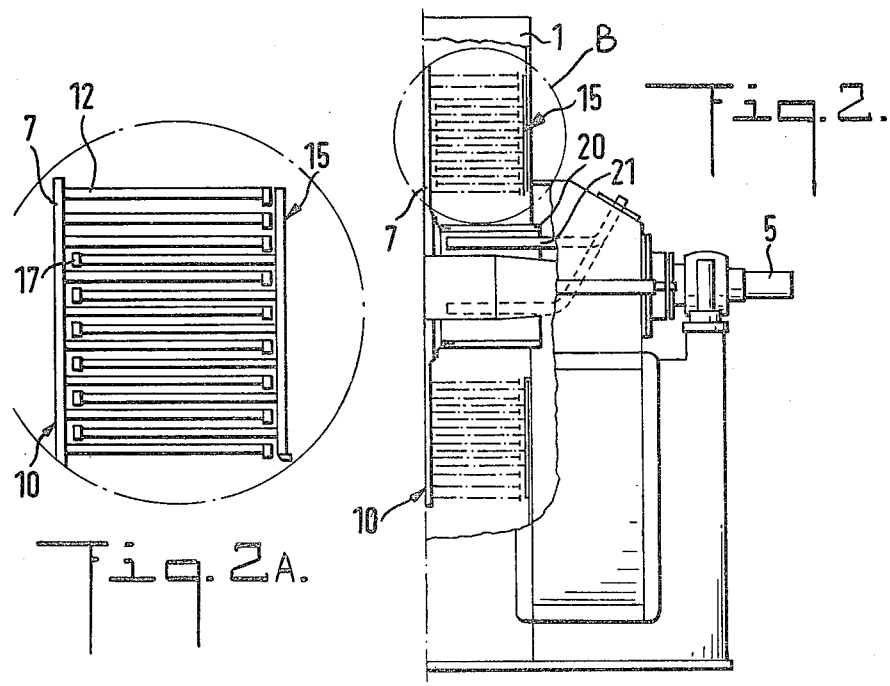
Fig. 2.
Fig. 2A.

APPARATUS FOR SCRUBBING GASES

The instant invention relates to an apparatus for scrubbing gases by means of finely divided cleansing liquid drops and the simultaneous feeding of the scrubbed gas.

Such gas scrubbers are used, among others, to free blast furnace gases issuing from shaft furnaces of any kind, such as cupola furnaces, blast furnaces, zinc and lead blast furnaces from impurities, to cleanse carbon monoxide gases resulting in special generators in the chemical industry and carbon monoxide gases exiting from electric furnaces used to produce carbide, pig iron, ferroalloys, and tin, and to scrub producer gases issuing from reactors for any kind of fuel, as well as synthesis gases and pyrolysis gases. Apparatus for scrubbing gases of the kind with which the instant invention is concerned thus are used in foundries and in the metal, steel, and chemical industries.

These gas scrubbers also are known as disintegrator gas scrubbers whose task it is to strip not only solids but also gaseous noxious components from gases at a high separating efficiency and by means of cleansing water which is introduced and finely divided. By virtue of the thrust they themselves exert on the gases sucked in, such disintegrators not only are gas scrubbers but, at the same time, also fans whereby the scrubbed gas may be fed into downstream plants without having to provide a separate fan.

Disintegrator gas scrubbers have been known from many decades and are described, for instance, in Ullmann's "Enzyklopädie der technischen Chemie", 3rd edition, vol. 1, page 406. They are being built for flow rates of from 10 m³/h to 150 000 m³/h.

The fundamental structure of such a known disintegrator gas scrubber is described in German Pat. No. 739,219 which corresponds to U.S. Pat. No. 2,338,373.

BRIEF DESCRIPTION OF THE DRAWINGS

FIG. 1 illustrates a side elevation view, partly in cross-section, of a disintegrator gas scrubber in accordance with one embodiment of the present invention.

FIG. 1A is a detail cross-sectional view of the area indicated by circle A in FIG. 1.

FIG. 2 illustrates a front elevation view, partly in cross-section, of a disintegrator gas scrubber such as illustrated in FIG. 1.

FIG. 2A is a detail cross-sectional view of the area indicated by circle B in FIG. 2.

DETAILED DESCRIPTION

The disintegrator gas scrubber comprises an approximately flat cylindrical or flat spiral-shaped fan casing 1 including a lateral gas suction duct 2 which opens centrally and guides the gas to be purified. In a manner similar to a fan, a gas discharge duct 3 leads away from the periphery. A rotor shaft 5 among others is supported in a robust bearing on a support outside of the fan casing 1. Inside the fan casing 1 the rotor shaft 5 carries a supporting disc 7 which is fixed normal to the shaft axis near the end thereof. A rotor bar cage 10 consisting of a plurality of concentric rings 11 of bars 12 which extend parallel to the axis (parallel to the rotor shaft) is fixed on the supporting disc 7. Fixed to the fan casing 1 is a stator bar cage 15 consisting of a plurality of concentric rings 16 of bars 17 which extend parallel to the axis, these rings 16 each projecting between two rings 11 of bars 12 of the rotor bar cage 10 so that the stator bar cage protrudes entirely into the rotor bar cage 10. In cross section these bars 12 and 17 of the rotor and stator bar cages 10 and 15, respectively, each have an oblong shape, particular drop shape. Their length in circumferential direction is about twice as long as in radial direction. They are disposed at a small angle of attack $\alpha$ with respect to the circumferential direction, and the direction of incidence of the bars of the stator bar cage is opposed to that of the bars of the rotor bar cage. The spacing between the rings of bars is the same in each case.

Such drop-shaped bars are known (German patent No. 739 219). In the cited patent the angle of attack is shown to be greater than 35°. However, in embodiments of the disintegrator gas scrubber actually realized, this angle is no greater than 11° to 13°.

As the rings 16 of bars 17 of the stator bar cage 15 each project between the rings 11 of bars 12 of the rotor bar cage 10, there is at least one, sometimes two more rotating rings 11 of bars 12 than there are stationary rings 16 of bars 17. As already mentioned, the spacing between all rings 11 and 16 is the same.

A cleansing liquid distributor means 20 is disposed on the rotor shaft 5 within the rotor bar cage 10. It receives cleansing liquid from outside through cleansing liquid supply pipes 21 ending in the distributor means. The cleansing liquid distributor means 20 may be embodied by a so-called spray cylinder. The cleansing liquid fed through the cleansing liquid supply pipes 21 into the cleansing liquid distributor means is finely divided or vaporized inside the same and distributed uniformly throughout the width of the rotor.

The centrifugal action of the bars 12 of the rotor bar cage 10 causes the gas which is aspired centrally to be mixed with the water droplets. The mixture of gas and cleansing liquid then is propelled against the stationary bars 17. The effect of the impact and the atomized cleansing liquid cause wetting and separation of the solids and noxious components contained in the gas.

This process is repeated in each of the further rotating and stationary rings of bars. Even in case of fine dusts, a corresponding number of associated rings of bars provided high separating performance at simultaneous optimum fan action of the stationary and rotating rings of bars.

A cleansing liquid separator always is connected downstream of the disintegrator gas scrubber to separate cleansing liquid drops contained in the scrubbed gas together with the solids and noxious components.

What is aimed at in the design and construction of such a gas scrubber, on the one hand, is high separating efficiency, i.e. a high degree of separating the very fine solids and, on the other hand, optimum fan efficiency while, at the same time, obtaining the highest possible thrust. These requirements are opposed to each other because the result of high fan efficiency will be low separating performance. The design engineers, therefore, were confronted with the problem of finding the best compromise. And this was found when using up to four stator rings of bars and up to six rotor rings of bars, the maximum angle to attack of the drop-shaped bars with respect to the circumferential direction being 13° and the spacing between adjacent rings of bars being no more than 18 to 22% of the diameter of the innermost ring of bars. The spacing between bars in circumferential direction was harmonized on the basis of these dimensions.

It was believed that the values found provided the maximum degree of efficiency, particularly in the fine particle range at the best possible effectiveness of the fan. Accordingly, the disintegrator gas scrubbers were built on this basis for decades. Other means of purification were employed when gases containing finer particles had to be cleansed or still lower contents of residual solids were to be achieved; to this end cloth-type filters, for example, were used. On the other hand, higher degrees of separation could be obtained if additional fans were provided, particularly fans connected at the downstream end so that the gas scrubber need not fulfill the function of the fan at the same time.

It is, therefore, an object of the invention to provide a design of the disintegrator gas scrubber of the kind in question which will permit separating dusts of a particle size of less than 1 μm. It is also an object of the invention to provide a disintegrator gas scrubber of the kind mentioned which will permit the maximum degree of separation, i.e. produce residual dust contents of no more than 30 mg/m³ of gas. Yet another object of the invention resides in providing a gas scrubber which will yet operate as a fan of optimum effectiveness so that no additional fans are required and no loss of performance has to be put up with.

An apparatus for scrubbing gases (disintegrator gas scrubber) solving the above problems and comprising the features recited in the preamble of claim 1, in accordance with the invention, comprises eight to ten rotor rings of bars and six or seven stator rings of bars, the bars of all rings being disposed at angles of 16° to 22° (angles of attack α) with respect to the circumferential direction. The same spacing between adjacent rings of bars is from 25 to 30% of the diameter of the innermost ring of bars. Conveniently, the bars are of drop shape, as is known.

Surprisingly, it has been found that with the novel geometry and design of the stator and rotor rings 11 and 16 of bars, in accordance with the invention, the minor increase in number of the same is possible and still the separating efficiency is increased so considerably—and not at the expense of the fan effectiveness—that even the finest dusts having particle sizes of less than 1 μm can be separated most perfectly and completely. The invention, for the first time, makes it possible to replace the cloth-type filters by disintegrator gas scrubbers to achieve perfect separation of the finest dusts from the usually hot gases mentioned.

Gas scrubbers for small rates of flow will have a diameter of approximately 150 mm of the innermost rotor ring of bars and of approximately 700 mm of the outermost rotor ring of bars, while comprising eight rotor rings of bars. At the highest rates of flow, on the other hand, the diameter of the innermost rotor ring of bars will be approximately 1200 mm and that of the outermost rotor ring of bars will be about 2500 mm.

What is claimed is:

1. An apparatus for scrubbing gases, comprising an approximately flat cylindrical or flat spiral-shaped fan casing, at least one gas suction duct for gas to be purified opening centrally into said casing, a gas discharge duct leading away from the periphery of said casing, a rotor shaft supported coaxially with the axis of the fan casing, at least one supporting disc fixed on the rotor shaft in a direction normal to the axis, a rotor bar cage fixed on the supporting disc and consisting of eight to ten concentric rotor rings of bars at uniform spacings and each having bars drop-shaped in cross section extending parallel to the axis and being approximately twice as long in circumferential direction as in radial direction, as seen in cross section, each bar being disposed at an angle of from 16° to 22° with respect to the circumferential direction, a stator bar cage completely extending into the rotor bar cage, being fixed to the fan casing, and consisting of a plurality of concentric rings of bars at uniform spacings and projecting between two rings of bars each of the rotor bar cage, the bars thereof having a drop-shaped cross section and extending parallel to the axis and being approximately twice as long in circumferential direction than in radial direction, as seen in cross section, each bar being disposed at an angle of from 16° to 22° with respect to the circumferential direction and in a direction opposed to the bars of the rotor bar cage, the same spacing between all rings of bars amounting to from 25% to 30% of the diameter of the innermost ring of bars, and means for introducing cleaning liquid into said casing.

* * * * *